US006438214B1

United States Patent
Yun

(10) Patent No.: US 6,438,214 B1
(45) Date of Patent: Aug. 20, 2002

(54) ANSWERING SYSTEM FOR A COMMUNICATION DEVICE

(75) Inventor: Hyung-Sik Yun, Seoul (KR)

(73) Assignee: LG Semicon Co., Ltd., Chungcheongbuk-do (KR)

( * ) Notice: Subject to any disclaimer, the term of this patent is extended or adjusted under 35 U.S.C. 154(b) by 0 days.

(21) Appl. No.: 09/333,959

(22) Filed: Jun. 16, 1999

(30) Foreign Application Priority Data

Jun. 24, 1998 (KR) .......................................... 98-23808

(51) Int. Cl.[7] ................................................ H04M 1/64
(52) U.S. Cl. ......................... 379/67.1; 379/70; 379/77; 379/88.01; 379/88.04
(58) Field of Search ........................... 379/67.1, 68, 69, 379/70, 72, 76, 80, 82, 83, 88.01, 88.04, 88.12, 88.22, 142, 77, 81, 86, 93.05, 88.09, 88.07, 419, 422, 388.06, 380

(56) References Cited

U.S. PATENT DOCUMENTS

| | | | |
|---|---|---|---|
| 4,660,220 A | | 4/1987 | Kraus .......................... 379/210 |
| 5,394,445 A | * | 2/1995 | Ball et al. ................... 379/67.1 |
| 5,483,577 A | * | 1/1996 | Gulick ........................ 379/67.1 |
| 5,978,451 A | * | 11/1999 | Swan et al. ............... 379/88.24 |
| 6,026,152 A | * | 2/2000 | Cannon et al. ............. 379/142 |

* cited by examiner

*Primary Examiner*—Allan Hoosain
(74) *Attorney, Agent, or Firm*—Birch, Stewart, Kolash & Birch, LLP

(57) ABSTRACT

The present invention provides an answering system for a communication device which, when set up with an automatic answering mode because a called party is absent or does not want to answer it, responds to a calling party by outputting automatically an responding message that a telephone of the called party is set up with an automatic answering mode for a predetermined time, whereby an user of the calling party is informed that an automatic answering mode of a telephone of a called party is activated although the communication has not completed yet. Accordingly, an user of the calling party pays no bill which is unnecessary when an automatic answering mode is activated on a telephone of the calling party, and the efficiency of communication system increases since the phone lines are free from the unnecessary phone calls. The present invention includes an answering system having an automatic answering system wherein the answering system is connected to a telephone switching system through signal transferring lines, wherein calling signals are generated from the telephone switching system when an automatic answering mode is set up and then wherein a predetermined voltage is applied to the signal transferring lines after a certain time has elapsed from a point from which the calling signals have been generated, and wherein the answering system for a communication device starts to be activated when the calling signals keep on going until the end point of supplying the signal transferring lines with the predetermined voltage.

9 Claims, 2 Drawing Sheets

ANSWERING SYSTEM FOR A COMMUNICATION DEVICE

BACKGROUND OF THE INVENTION

1. Field of Invention

The present invention relates to an answering system for a communication device, more particularly to an answering machine for a telephone, when set up with an automatic answering mode because a called party is absent or does not want to answer it, which responds to a calling party by outputting automatically an responding message having been recorded thereon once predetermined calling signals are transmitted to the telephone by a telephone switching system.

2. Discussion of Related Art

An automatic answering system detects the number of ringing tones which are generated by a tone ringer in accordance with incoming signals through a telephone switching system from a calling party. Then, the automatic answering system responds to the calling party by means of outputting an answering message once a predetermined value is satisfied with the number of ringing tones. The automatic answering system, when answering, sends the answering message having been recorded on a magnetic tape or the like to the calling party.

In this case, the caller may leave a message in a message storing device such as a magnetic tape of a called party who is able to check the message whenever he wants to. Lately, instead of the magnetic tape as a message storing device, the magnetic tape is replaced by a digital chip which provides an excellent voice and has long endurance.

FIG. 1 shows a block diagram of a telephone according to a related art.

Referring to FIG. 1, an incoming call detector 10 detects calling signals transmitted from a telephone switching system through two lines L1 and L2 for carrying signals. Calling signals, data signals of voice signals transmitted from a calling party and the like are carried through the lines L1 and L2.

To terminals of input and output of the incoming call detector 10, switches 11 and 12 are connected, respectively. The switches 11 and 12 work as hook switches. The switch 11 switches between a local line L1 and the input terminal of the incoming call detector 10. Outputs of the incoming call detector 10 go to either a path A or the other path B by the other switch 12.

A tone ringer 13 generates ringing tones by driving an external display such as a buzzer or a bell, which is not shown in the drawing, once calling signals from the telephone switching system are inputted through the path A of the switch 12. A called party is notified of the incoming call by the ringing tones.

On an off-hook state that a closed circuit is formed between a telephone and the telephone switching system when a receiver is picked up, a speech network 14 generates audible voice signals by means of driving a speaker 15 of the telephone which is an external output device or a speaker equipped inside the telephone body, once voice signals from the telephone switching system are inputted through the other path B of the switch 12. Thereby, the called party receives a message transmitted by the calling party.

A line voltage regulator 17 generates an output of 5V or 45V. A voltage of 45V is generated during an on-hook state, while a voltage of 5V is generated during the off-hook state.

In the automatic answering system for a telephone of the related art, a signal delivering line is formed between a calling party and a called party -by a telephone switching system-once the predetermined calling signals are generated from the telephone switching system, and then a communication is carried out by responding to the incoming call by means of outputting automatically a pre-recorded answering message.

However, a phone call is made even though a calling party has no intention to leave a message in the automatic answering machine of the called party but speak directly to the called party. Thus, the calling party has to pay the bill which is unnecessary, and the efficiency of communication system decreases since the phone lines are occupied by the unnecessary phone calls.

SUMMARY OF THE INVENTION

Accordingly, the present invention is directed to an answering system for a communication device that substantially obviates one or more of the problems due to limitations and disadvantages of the related art.

The object of the present invention is to provide an answering system for a communication device which, when set up with an automatic answering mode because a called party is absent or does not want to answer it, responds to a calling party by outputting automatically an responding message that a telephone of the called party is set up with an automatic answering mode for a predetermined time, whereby unnecessary calls are avoided by informing the calling party that the automatic answering mode is activated in spite of disconnected communication.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention includes an answering system having an automatic answering system wherein the answering system is connected to a telephone switching system through signal transferring lines, wherein calling signals are generated from the telephone switching system when an automatic answering mode is set up and then wherein a predetermined voltage is applied to the signal transferring lines after a certain time has elapsed from a point from which the calling signals have been generated, and wherein the answering system for a communication device starts to be activated when the calling signals keep on going until the end point of supplying the signal transferring lines with the predetermined voltage.

In another aspect of the present invention, an answering system for a communication device wherein the answering system has an automatic answering system and is connected to a telephone switching system through signal transferring lines, includes an incoming call detector detecting signals having been transmitted from the telephone switching system through the signal transferring lines, a hook switch further including a first switch switching between the signal transferring lines and the incoming call detector, and a second switch branching outputs of the incoming call detector into a first path or a second path, a tone ringer generating ringing tones by means of driving an external display when calling signals transmitted from said telephone switching system are inputted through the first path, a voltage regulator further including an automatic answering mode voltage regulator generating a first output voltage, and a line voltage regulator generating a second output voltage or a third output voltage wherein the line voltage regulator generates the second output voltage on an on-hook state or generates the third output voltage on an off-hook state, a third switch switching a third path and a fourth path wherein the third path lies between the second path and an output terminal of the automatic answering mode voltage regulator and wherein the fourth path lies between the second path and an output terminal of the line voltage regulator, a counter counting the number of the ringing tones generated from the tone ringer wherein the counter is set up with a predetermined count value as a reference, a timer set up with a predetermined reference time wherein the timer connects the third switch to the third path for a period from a point where a counting value of the counter is satisfied with the predetermined count value until the predetermined reference time is elapsed and wherein the timer connects the third switch to the fourth path after the predetermined reference time has elapsed.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this application, illustrate embodiments of the inventing and together with the description serve to explain the principle of the invention.

DETAILED DESCRIPTION OF PREFERRED EMBODIMENTS

Reference will now be made in detail to the preferred embodiment of the present invention, an example of which is illustrated in the accompanying drawings.

Figure 1:
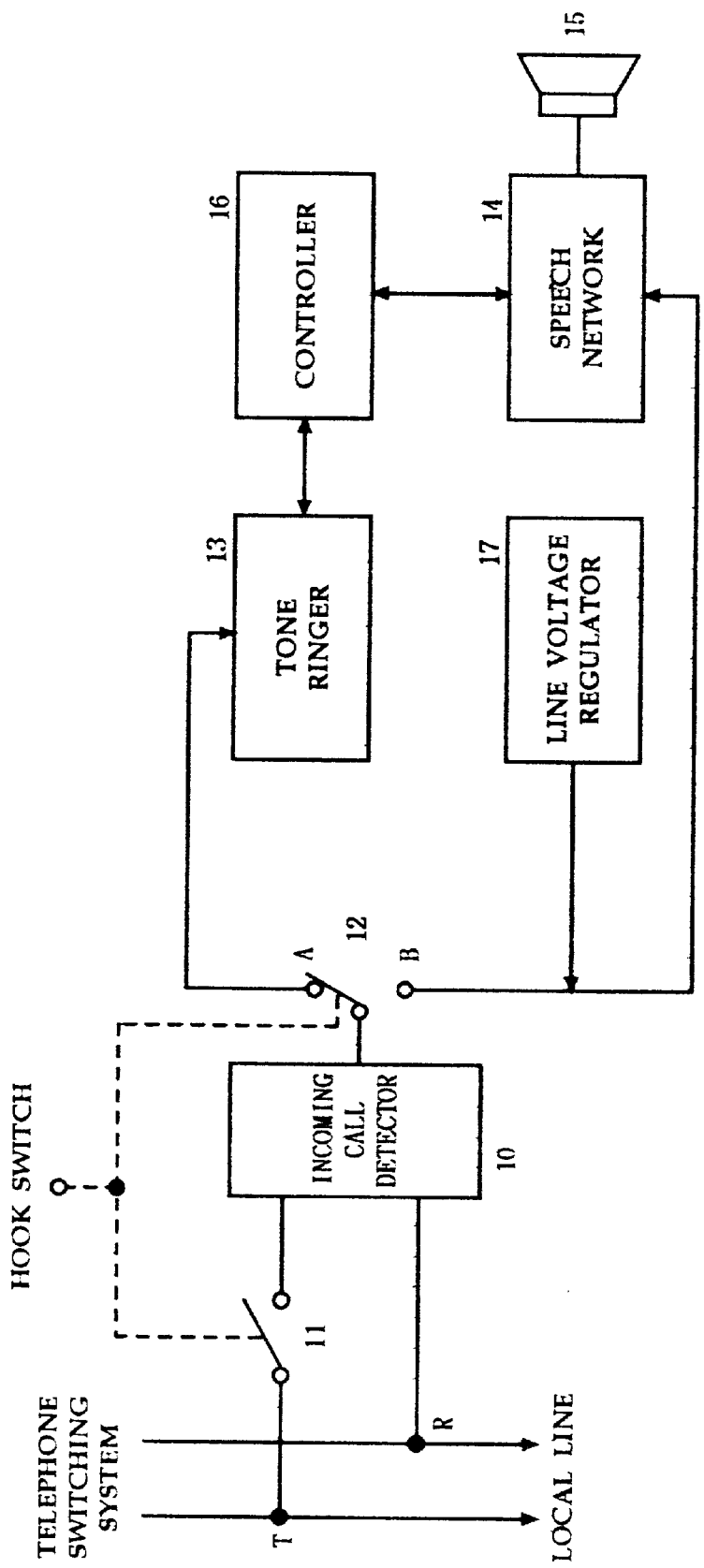
FIG. 1 shows a block diagram of a telephone according to a related art.
Figure 2:
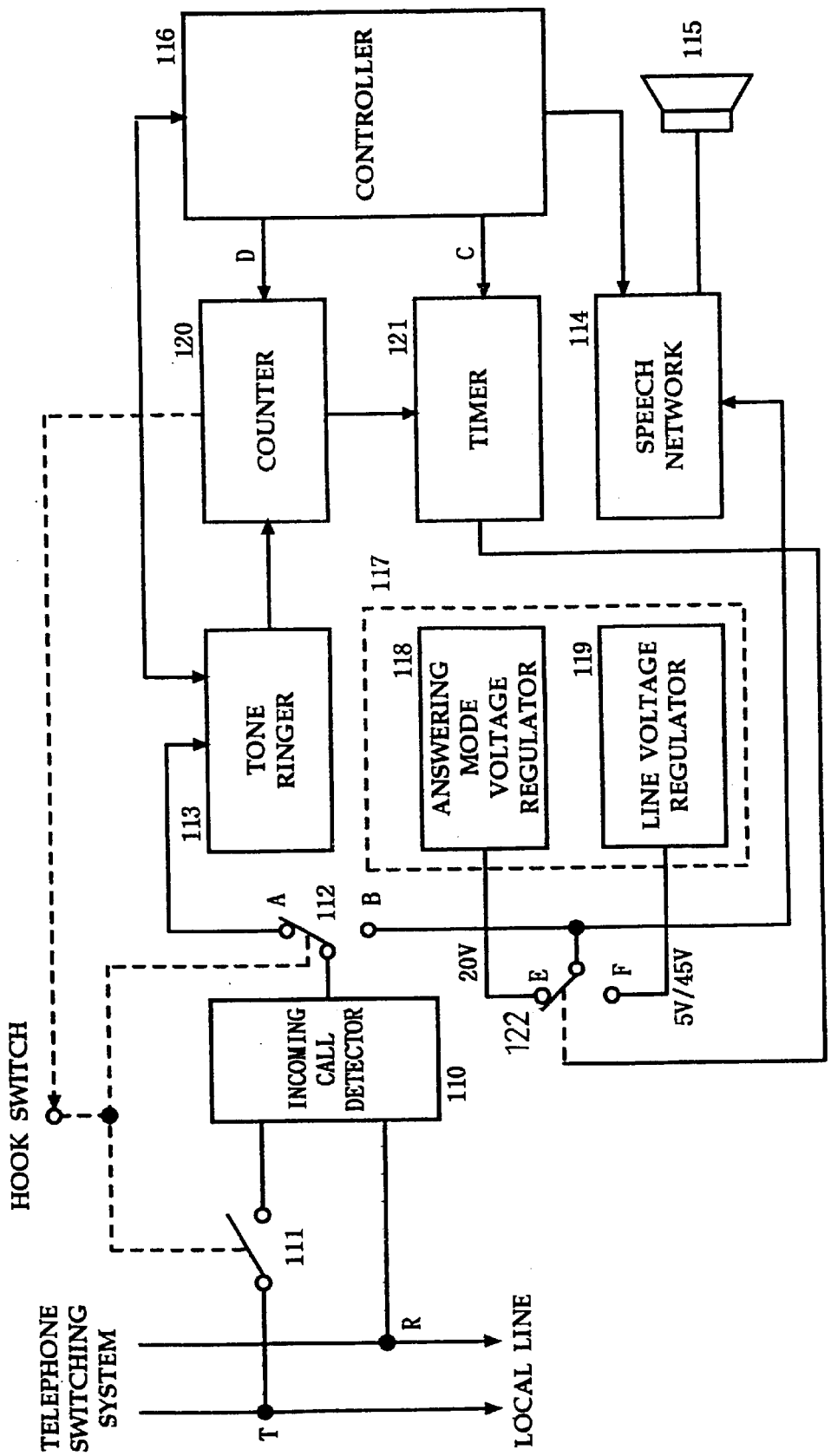
FIG. 2 shows a block diagram of a telephone which is equipped with an automatic answering system.

FIG. 2 shows a block diagram of a telephone which is equipped with an automatic answering system.

Referring to FIG. 2, an incoming call detector 110 detects calling signals transmitted from a telephone switching system through two lines L1 and L2 for carrying signals. Calling signals, data signals of voice signals transmitted from a calling party and the like are carried through the lines L1 and L2.

To terminals of input and output of the incoming call detector 110, switches 111 and 112 are connected, respectively. The switches 111 and 112 work as hook switches. The switch 111 switches between a local line L1 and the input terminal of the incoming call detector 110. Outputs of the incoming call detector 110 go to either a path A or the other path B by the other switch 112.

A tone ringer 113 generates ringing tones by driving an external display such as a buzzer or a bell, which is not shown in the drawing, once calling signals from the telephone switching system are inputted through the path A of the switch 112. A called party is notified of the incoming call by the ringing tones.

On an off-hook state that a closed circuit is formed between a telephone and the telephone switching system when a receiver is picked up, a speech network 114 generates audible voice signals by means of driving a speaker 115 of the telephone which is an external output device or a speaker equipped inside the telephone body, once voice signals from the telephone switching system are inputted through the other path B of the switch 112. Thereby, the called party receives a message transmitted by the calling party.

A voltage regulator 117 consists of an automatic answering mode voltage regulator 118 generating an output of 20 V and a line voltage regulator 119 generating an output of 5V or 45V. Set up with an automatic answering mode on an off-hook state, automatic answering mode voltage regulator 118 generating an output of 20 V. The line voltage regulator 119 generates the voltage of 45V on an on-hook state or the voltage of 5V on an off-hook state.

A third switch 122 switches a path E between an output terminal of the automatic answering mode voltage regulator 118 and the path B or another path F between an output terminal of the line voltage regulator 119 and the path B. The third switch 122 is connected to the path F to supply the path B with a voltage of 45V on an on-hooked state or is connected to the path E to supply the path B with a voltage of 20V during an on-hooked state of an automatic answering mode.

A predetermined count value D as a reference is set up by a counter 120 which counts the number of ringing tones generated from the tone ringer 113. The counting operation by the counter 120 determines an activation point of a timer 121.

Namely, the count value D decided arbitrarily by a user determines whether an answering message will be outputted under the condition that how many times the ringing tone rings at the called party after the calling signals have been generated from the calling party.

A determined reference time is set up in the timer 121 which generates control signals controlling the third switch 122. The control signals connect the third switch 122 to the path E from the point at which the count value of the counter 120 is satisfied with the reference count value D to the determined reference time. After the reference time has been elapsed, the third switch 122 is connected to the path F by the control signals.

An automatic answering system of the present invention does not produce an answering message even though the output point of the answering message, which is decided as the reference count value D by the user of the called party, has been reached. Instead of outputting the answering message, a voltage of 20V is applied to a signal transferring line when the time set up by the user of the called party arbitrarily has been reached.

Supplying the signal transferring line with a voltage of 20V is to let the telephone switching system recognize that an operation mode of the called party is at the automatic answering mode. The time of supplying the signal transferring line with the voltage of 20V is fixed by the fabrication of a telephone.

However, while the process of supplying the voltage of 20V from the point of generating the calling signals, the communication is not completed since the telephone switching system does not connect the calling party to the called party. This is the distinguished operational characteristics of the present invention. Particularly, the calling party is not connected to the called party reciprocally as well as the answering message is not outputted, and the telephone switching system can detect the fact that the automatic answering mode of the called party has been set up by means of only supplying a tip line T and a ring line R which are signal transferring lines connected to the telephone switching system with a specific level of voltage of 20V when the calling party is still disconnected to the called party.

In this case, the lines to be supplied with voltage are the tip line T and the ring line R which connect the local lines L1 and L2 to a telephone. And the tip line T and the ring line R are also a tip of a contact plug and a ring which are used for connecting the telephone to the local lines. The end of the metal part of the contact plug is so-called a tip, and a ring-shaped part made of insulator next to the tip is so called a ring. The tip of the contact plug and the line which is connected to the ring are so-called a tip line and a ring line, respectively.

When the calling. signals still keep ringing after the above-mentioned procedures have been carried out, which means that the user of the calling party wants to leave a message in a recorder of the called party after hearing an answering message of the called party, the called party for the first time outputs the answering message and stores the message of the calling party.

The present invention provides an answering system for a communication device which, when set up with an automatic answering mode because a called party is absent or does not want to answer it, responds to a calling party by outputting automatically an responding message that a telephone of the called party is set up with an automatic answering mode for a predetermined time, whereby an user of the calling party is informed that an automatic answering mode of a telephone of a called party is activated although the communication has not completed yet.

Accordingly, an user of the calling party pays no bill which is unnecessary when an automatic answering mode is activated on a telephone of the calling party, and the efficiency of communication system increases since the phone lines are free from the unnecessary phone calls.

It will be apparent to those skilled in the art that various modifications and variations can be made in an answering system for a communication device of the present invention without departing from the spirit or scope of the inventions. Thus, it is intended that the present invention cover the modifications and variations of this invention provided they come within the scope of the appended claims and equivalents.

What is claimed is:

1. A method of operating an answering system for a communication device, said answering system including an automatic answering system, said answering system connected to a telephone switching system through signal transferring lines, comprising:

selectively activating said automatic answering system;

generating calling signals from said telephone switching system;

said automatic answering system providing a predetermined voltage to said signal transferring lines to indicate that the automatic answering system is operational while preventing an indication of said calling signal being connected, said predetermined voltage being supplied after a certain time has elapsed after said calling signal has been generated and continuing for a predetermined time;

supplying a first and a second voltage different from said predetermined voltage to said signal transferring lines when said automatic answering system is not operational and also after said predetermined voltage is no longer supplied when the automatic answering system is operational, said first and second voltages being indicative of an on-hook situation and an off-hook situation; and activating said automatic answering system and completing a calling signal when said calling signal continues after the predetermined voltage ceases to be supplied to said signal transferring lines.

2. The method of operating an answering system for a communication device according to claim 1, wherein a time for starting to supply said predetermined voltage from said point from which said calling signals have been generated is a time to which said automatic answering mode is activated from another time at which said calling signals fixed by an user are generated.

3. The method of operating an answering system for a communication device according to claim 1, wherein a time of supplying said signal transferring lines with said predetermined voltage is an intrinsic time set up inside said answering system.

4. The method of operating an answering system for a communication device according to claim 1, wherein a connection for a communication has not been completed from a point from which said calling signals are generated until a process of supplying said signal transferring lines with said predetermined voltage has been completed.

5. An answering system for a communication device, said answering system having an automatic answering system, said answering system connected to a telephone switching system through signal transferring lines, said answering system comprising:

an incoming call detector detecting signals having been transmitted from said telephone switching system through said signal transferring lines;

a hook switch, said hook switch further comprising:
  a first switch switching between said signal transferring lines and said incoming call detector; and
  a second switch branching outputs of said incoming call detector into a first path or a second path, a tone ringer generating ringing tones by means of driving an external display when calling signals transmitted from said telephone switching system are inputted through said first path;

a voltage regulator, said voltage regulator further comprising:
  an automatic answering mode voltage regulator generating a first output voltage; and
  a line voltage regulator generating a second output voltage or a third output voltage, wherein said line voltage regulator generates said second output voltage on an on-hook state or generates said third output voltage on an off-hook state, a third switch switching a third path and a fourth path, said third path lying between said second path and an output terminal of said automatic answering mode voltage regulator, said fourth path lying between said second path and an output terminal of said line voltage regulator;

a counter counting the number of said ringing tones generated from said tone ringer, said counter set up with a predetermined count value as a reference;

a timer set up with a predetermined reference time, said timer connecting said third switch to said third path for a period from a point where a counting value of said counter is satisfied with said predetermined count value until said predetermined reference time is elapsed, said timer connecting said third switch to said fourth path after said predetermined reference time has elapsed.

6. The answering system for a communication device according to claim 5, wherein said first switch is open and also said second switch is connected to said first path during said on-hook state and wherein during said off-hook state said first switch is shorted and also said second switch is connected to said second path.

7. The answering system for a communication device according to claim 5, wherein said predetermined count value as a reference is a value of activating said automatic answering mode after said calling signals have been generated.

8. The answering system for a communication device according to claim 5, wherein said predetermined reference time is fixed inside said answering system.

9. The answering system for a communication device according to claim 5, wherein a communication is not completed from a point when said calling signals are generated until said predetermined reference time has been elapsed.

* * * * *